Feb. 26, 1963 L. PERHACS 3,078,884
LIVE CENTER
Filed May 25, 1961

INVENTOR:
LESLIE PERHACS
BY
ATTORNEY.

United States Patent Office 3,078,884
Patented Feb. 26, 1963

3,078,884
LIVE CENTER
Leslie Perhacs, 10926 Burbank Blvd.,
North Hollywood, Calif.
Filed May 25, 1961, Ser. No. 112,656
1 Claim. (Cl. 142—53)

This invention relates to machine tools and more especially to a live center for the tailstock of lathes.

Live centers as heretofore developed are subject to numerous defects and shortcomings, among which are a bearing race formed at the end of the shell or sleeve and the overlying flange of the center point which encloses the dust shield. The further disadvantage of older centers is the lack of provision for keeping the bearing balls spaced or separated to avoid undue wear.

These shortcomings and disadvantages of prior art centers have been overcome in the present invention wherein the principal object of the invention is to provide a simple, practical and inexpensive live center of the character described.

Another object of the invention is to provide a novel and improved live center having a more efficient bearing construction and wherein the bearings are provided with an improved seal and spacing means to prevent undue wear.

A further object of the invention is to provide a novel live center having an unusually long life.

Other objects and advantages will appear and be brought out more fully in the following specification, reference being had to the accompanying drawing wherein.

Figure 1:
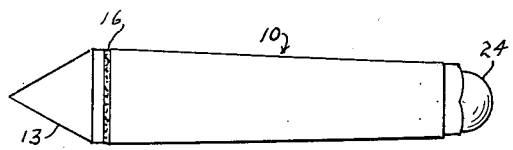
FIGURE 1 is a side view of a live center incorporating the present invention.
Figure 2:
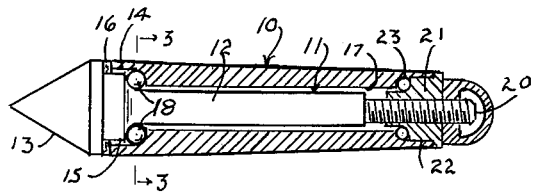
FIGURE 2 is a view of the same in central section.
Figure 3:
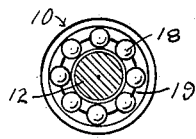
FIGURE 3 is a sectional view taken along the line 3—3 of FIGURE 2.

Referring more particularly to the drawing, the present invention is incorporated in a live center having a sleeve 10 and a spindle member 11. The spindle member has a shank 12 and a head 13 which has a tapered work-supporting point. Sleeve 10 is shown as having a Morse taper, and the forward end is formed with a counter bore 14 which has a slight taper of substantially one thousandth of an inch. Head 13 of the spindle member has a cylindrical portion 15 extending into and having slight clearance with respect to counter bore 14, and has a smaller diameter than the intermediate portion of the head, there being a felt ring washer 16 surrounding portion 15 which abuts the end of sleeve member 10. Sleeve member 10 has a bore 17 to receive shank 12, and the inner end of counter bore 14 is formed with a 90 degree base arc forming a thrust bearing.

Portion 15 of the spindle head is formed with a similar thrust bearing arc and a plurality of bearing balls 18 are disposed between the two bearing races. Balls 18 are held in spaced relation by a spacer 19.

Spindle shank 12 has a threaded end 20 on which is run a cylindrical bearing member 21 which interfits in a recess 22 in the opposite end of sleeve member 10. Recess 22 is of larger diameter than sleeve bore 17, and has a curved inner end to form a bearing race for a plurality of bearing balls 23 which also seat against a similarly formed bearing race in bearing member 21. A dust cap 24 is threaded on the end of spindle threaded portion 20.

The operation and advantages of the invention should be clear from the foregoing description. It will be seen that the respective bearing races are substantially an arc of 90 degrees and that they face each other at an angle of 45 degrees from the spindle axis. Furthermore, the outer end of tapered counter bore 14 is filled by cylindrical portion 15 of the end 13 and both bearing races are well protected from dirt and will have long life because of the adjacency of the sleeve which extends forwardly a relatively great distance.

Having described my invention what I claim is:

A live center for the tailstock of a lathe comprising, a sleeve and a spindle member rotatably mounted within said sleeve, said spindle member having a shank threaded at one end and a work-supporting tapered head at the other end, said sleeve having a counterbore into which said head extends, said head and said sleeve having complementary bearing ball races, bearing balls operative between said races, a member retaining said balls in spaced relation, a bearing bushing on said shank threaded end having a portion extending into said sleeve and an external accessible portion extending out of said sleeve permitting relative adjustment of the ball bearing engagement and the bushing bearing engagement, and a retaining nut and dust cover on said shank outer end adjacent the bearing bushing.

References Cited in the file of this patent
UNITED STATES PATENTS

| | | |
|---|---|---|
| 1,080,082 | Sparks | Dec. 2, 1913 |
| 1,442,364 | Schnelle | Jan. 16, 1923 |
| 2,006,801 | Gibbs | July 2, 1935 |

FOREIGN PATENTS

| | | |
|---|---|---|
| 497,443 | Germany | May 8, 1930 |